INVENTORS:
CASIMIR K. KOWALEWSKI
NICHOLAS S. DANKO

BY George F. Des Marais
ATTORNEY

United States Patent Office 3,498,645
Patented Mar. 3, 1970

3,498,645
PIPE JOINTS WITH LIMITED EXTENSIBILITY
Casimir K. Kowalewski, Lincoln Park, and Nicholas S. Danko, Livingston, N.J., assignors to Interpace Corporation, Parsippany, N.J., a corporation of Delaware
Filed July 12, 1968, Ser. No. 744,479
Int. Cl. F16l 21/00, 25/00
U.S. Cl. 285—230        2 Claims

ABSTRACT OF THE DISCLOSURE

Extensible bell and spigot pipe joints wherein the axial extensibility of a joint is limited by stop means located to the outboard side of the joint sealing ring of coupled bell and spigot rings and comprises members threaded through the bell ring and positioned to be engaged by an annular abutment on the exterior of the spigot ring to limit the extent of uncoupling movement.

---

This invention relates to extensible pipe joints and means for limiting the extension of joints.

Concrete pipes for conducting water in water supply systems are commonly connected by telescoping coupling members including a steel socket or bell ring at a pipe end and a steel spigot ring at an end of another pipe. Sealing means in the form of an endless ring or gasket of an elastomeric material seals the joint when the joint rings are coupled upon shoving one of the pipes endwise toward the other with the bell ring moving over the spigot ring and the gasket.

In one form of pipe coupling a certain amount of extensibility is permissible owing to the fact that the interior cylindrical surface of a bell ring which bears upon the gasket to seal the joint is longer than the width of the gasket or the axial length of the surface on the spigot onto which the gasket bears. Limited extensibility of joints is desirable because some base or soil conditions may result in the settling of a pipe line or of sections thereof after the line is laid. Then too, water under pressure can exert an endwise thrust on connected pipes which tends to uncouple joints unless some restraining means are provided to limit the extent of axial movement of the pipes.

The opening of one or more joints can be avoided by tying the joints. A manner of doing so while permitting limited extension of each of a number of joints without, however, allowing the joints to become unsealed is disclosed in the United States Patent No. 3,129,961, granted Apr. 21, 1964. While the harnessing means of that patent are efficacious for use with large diameter pipes or where the end thrust effective on a joint is particularly severe, they are relatively expensive for service with pipes of smaller diameters, such as pipes having internal diameters of about thirty inches and less.

Among the objects of the invention is to provide a harnessed extensible joint for concrete pipes having steel bell and spigot rings with which the harnessing means therefor are so associated as to be easily and rapidly assembled and adjusted even though the bell and spigot rings may not be perfectly aligned or are not in their fully closed or home position.

Another object is to effect economy in the manufacture and installation of tying means for bell and spigot joint rings.

According to the present invention, there is provided a joint between two sections of pipe, comprising a bell ring having a cylindrical interior surface extending over a spigot ring having an annular recess for seating a gasket which bears on the interior surface of the bell ring to seal the joint and a collar or ridge portion on the spigot ring located at the outboard side of the gasket and providing a transverse abutment or shoulder facing outwardly of the joint to be engageable by a plurality of screw members threaded through the bell ring to arrest relative movement of the spigot ring axially away from the bell ring.

Other objects and advantages of the invention will appear from a consideration of the following description of several embodiments thereof and from the accompanying drawing which forms a part of the specification. It is to be understood that the detailed description is illustrative and for the purpose of instructing how to use the invention, and that the scope of the invention will appear from the appended claims.

Figure 1:
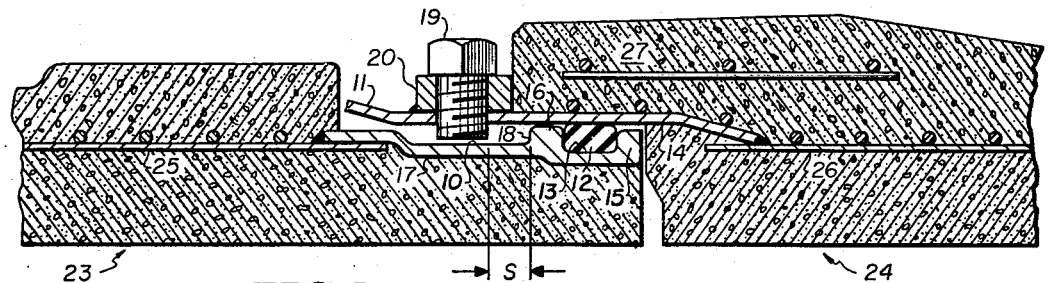
FIG. 1 is a longitudinal section of an extensible pipe joint embodying the invention.

FIG. 1 illustrates a joint having cylindrical telescoping members including a metal spigot ring 10 and a metal bell ring 11, and a joint seal in the form of an endless sealing ring or gasket 12 of resilient material such as rubber or other suitable elastomeric material.

Before a joint is closed (FIG. 2), the gasket is mounted in a circumferential recess in the form of an annular groove 13 in the spigot ring near its free end. The gasket is forcibly deformed and compressed by a cylindrical interior surface 14 of the bell ring 11 when the joint is closed. The bell ring 11 preferably consists of a rolled steel plate, having a flaring outer end which gradually deforms and compresses the gasket as the ring is slid over the end of the spigot, as is well understood in the art. An O-ring seal of the character described is known to be an effective seal for a pipe joint.

A side wall of the groove 13 is provided by a flange 15, and the opposite side of the groove at the outboard side of the gasket is formed by an annular ridge portion 16. The ridge portion 16 has a maximum outer diameter slightly less than the diameter of the interior surface 14 of the bell ring.

The ridge portion 16 rises from a connecting portion 17 of the spigot ring which provides an annular clear space exteriorly around the spigot ring and to the inside of the bell ring at a location axially outward of the joint relative to the location of the joint sealing gasket. The side of the ridge portion 16 facing the outboard end of the joint forms a laterally extending shoulder 18 which is adapted to be engaged by a plurality of radially extending screw members 19 equi-spaced around the bell ring in a plane perpendicular to the axis of the bell ring to limit the axial movement of the bell and spigot rings apart from one another. As shown in FIG. 1, the screw members would permit the joint to be extended a distance indicated by the letter S before they would abut the shoulder 18.

In order to stiffen the unsupported length of a relatively light bell ring, ring-like reinforcing means such as a heavy steel ring 20 may be welded to the exterior thereof.

The screw members 19 are preferably in the form of bolts with the ends 22 of their stems finished flat at right angles to their axes. They should fit the threaded holes in the bell ring sufficiently tight to prevent their inadvertent turning during handling of the pipe sections. Resistance to accidental turning can be assured by a locking patch of nylon, or of other suitable material, applied to the threads before screwing the bolts into the tapped holes.

Figure 2:
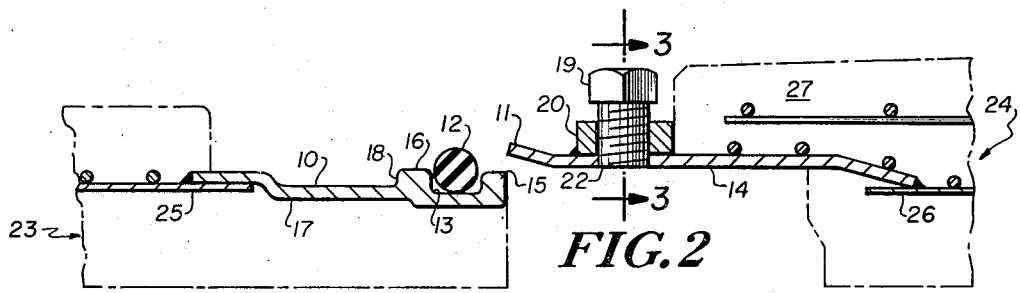
FIG. 2 is a longitudinal section through the joint members illustrated in FIG. 1 preliminarily to their engagement.
Figure 3:
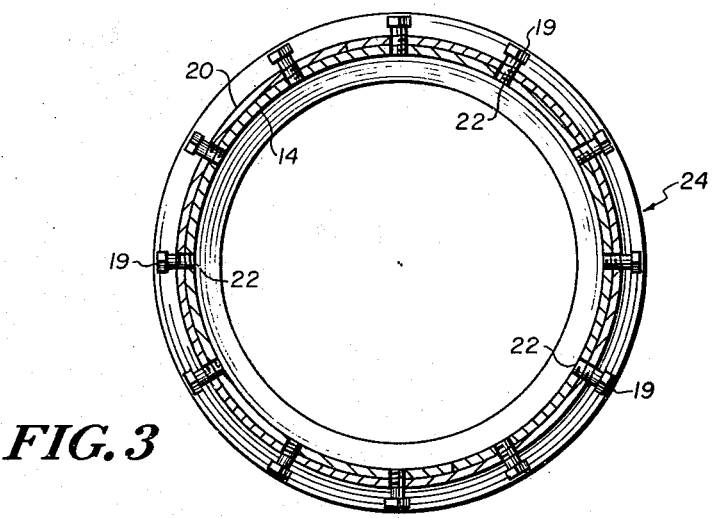
FIG. 3 is a cross-section through a portion of a bell ring on line 3—3 of FIG. 2.

The bolts are threaded into the member 20 and the bell ring 11 before the joint is assembled, as shown in FIGS. 2 and 3. Their ends 22 are made flush with the cylindrical interior surface 14 of the bell ring so that the gasket 12 will not be scored or otherwise injured by the bolts or the edges of the tapped holes when the bell ring is advanced over the gasket as it is shoved home to close the joint. Particularly in the case of small diameter pipes it is desirable that the ends 22 of the threaded stems be ground to the same curvature as that of the interior surface of the bell ring to assure smoothness and continuity with the latter surface.

The coupling members hereinabove described are illustrated in conjunction with pipe sections 23 and 24 of prestressed concrete pressure pipes having steel joint rings at their respective ends. Joint rings are welded to opposite ends of each watertight steel cylinder 25 and 26. Each cylinder is lined with a concrete core. The core customarily lines the interior of a spigot ring and also a portion of the interior of a bell ring of any one pipe section.

The exterior of the cylinder is covered with a coating of concrete which heretofore covered the entire exterior of the bell ring. In the present construction the coating 27 is modified to leave bare a substantial length of the exterior surface of the bell ring to effectuate the present invention.

Figure 4:
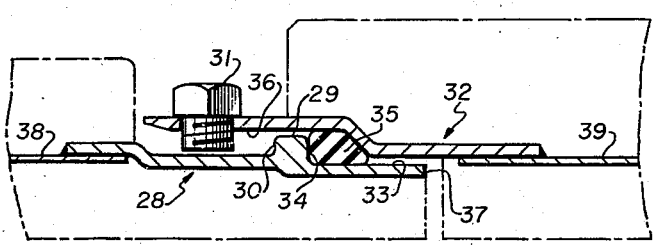
FIG. 4 is a longitudinal section of another embodiment of the present invention.

The joint illustrated in FIG. 4 includes a steel spigot ring 28 having a radially outwardly extending ridge portion 29 encircling the spigot ring intermediate its ends and providing a shoulder 30 facing toward the outboard end of the joint. The shoulder is engageable by a series of bolts 31 spacially arranged around the bell ring 32 to limit the axial extensibility of the joint as explained hereinabove.

A gasket-receiving recess on the spigot ring is provided by a circumferential surface 33 and the side surface 34 of the annular ridge portion 29 which extends laterally to the surface 33. The gasket 35 is deformed and pressed radially inwardly onto the surface 33 of the spigot ring by an interior surface 36 on the bell ring 32 which is substantially parallel to the surface 33. The surface 33 is generally cylindrical but it may slightly taper inwardly toward the free end 37 of the spigot ring, if desired.

The spigot ring 28 and the bell ring 32 are respectively attached and sealed to separate watertight steel tubes 38 and 39 which have joint rings (not shown) attached to their other ends, as is well understood. In certain types of concrete pipes these tubes are lined and covered by concrete, but it is apparent that the tied extensible joints of the present invention as formed by bell and spigot steel rings may be constituted as ends or as end parts of cast iron, ductible iron or steel pipe sections.

It is to be understood that the foregoing disclosure relates only to preferred embodiments of the invention and that numerous modifications and alterations may be made therein without departing from the spirit and scope of the invention.

What is claimed is:
1. A pipe joint comprising a metallic spigot ring of one large diameter pipe section, a metallic bell ring of another large diameter pipe section telescopically engaged with said spigot ring, a gasket forming a joint seal between said spigot ring and said bell ring, said spigot ring having a radially outwardly extending ridge portion encircling the spigot ring and forming at one side thereof an annular shoulder facing toward the mouth end of said bell ring, an annular recess formed on the exterior of said spigot ring inboard of the joint relative to said ridge portion for seating said gasket on the spigot ring, said bell ring having a cylindrical interior surface bearing upon said gasket, said cylindrical interior surface having a diameter slightly greater than the outer diameter of said ridge portion so that said bell ring may telescope said spigot ring and allow for some deflection of their axes, the length of said cylindrical interior surface being sufficiently great to encompass said ridge portion and remain in sealing engagement with said gasket irrespective of the location of said ridge portion and gasket relative to said cylindrical interior surface within a predetermined permissible range of axial movement of said spigot ring relative to said bell ring, and a plurality of at least eight bolts capable of engaging said shoulder to restrain axial movement of said spigot ring outward from said bell ring because of longitudinal thrust due to fluid pressure within said joined pipe sections, said bolts extending transversely of the axis of said bell ring through tapped holes in said bell ring which are substantially equi-spaced on a circle perpendicular to the axis of said bell ring, the threaded shanks of said bolts projecting radially inward of said cylindrical interior surface of said bell ring opposite from said shoulder on the spigot ring so as to be in the path of permissible longitudinal movement of said shoulder to be engaged thereby to counter the thrust on the joint due to fluid pressure, said bolts being sufficient in number and sufficiently closely spaced around the bell ring to distribute the fluid pressure thrust over all of said bolts when the pipe sections are aligned and over many of the bolts when the pipe sections are deflected to restrain further linear movement of said spigot ring from said bell ring and thereby prevent the unsealing of the joint, the distal end of the threaded shank of each of said bolts finished in a face substantially perpendicular to the axis of the bolt so as to span the tapped hole in which it is mounted and thus provide at said cylindrical interior surface of said bell ring, before the bolts are advanced inwardly of said surface, faces substantially continuous with said surface to avoid injury of said gasket when the spigot ring is introduced into the bell ring.

2. A pipe joint according to claim 1 wherein a ring member is affixed around and to the exterior of said bell ring to reinforce said bell ring to inhibit such expansion thereof as may tend to be effected by the reaction of said bolts on said shoulder because of thrust due to fluid pressure, said bolts extending through said ring member and said bell ring.

References Cited
UNITED STATES PATENTS

| | | | |
|---|---|---|---|
| 60,178 | 12/1866 | Gwynne | 285—404 |
| 443,934 | 12/1890 | Emerson | 285—404 X |
| 1,117,961 | 11/1914 | Phillips | 285—374 X |
| 1,126,386 | 1/1915 | Butts | 285—374 |
| 1,533,875 | 4/1925 | McCleary | 285—404 X |
| 2,090,008 | 8/1937 | Newmark et al. | 285—404 X |
| 2,470,818 | 5/1949 | Hirsh | 285—288 |
| 2,521,127 | 9/1950 | Price | 285—347 X |
| 3,177,019 | 4/1965 | Osweiler | 285—288 |
| 3,212,797 | 10/1965 | Osweiler | 285—288 |
| 3,222,075 | 12/1965 | Haeber | 285—404 X |

THOMAS F. CALLAGHAN, Primary Examiner

U.S. Cl. X.R.

285—404